United States Patent
Horiguchi et al.

(10) Patent No.: US 9,488,770 B2
(45) Date of Patent: Nov. 8, 2016

(54) LIGHT SOURCE UNIT AND DISPLAY APPARATUS

(71) Applicant: Sakai Display Products Corporation, Sakai-shi, Osaka (JP)

(72) Inventors: Yuki Horiguchi, Sakai (JP); Takayuki Nakazawa, Sakai (JP); Kazuhiko Negoro, Sakai (JP); Takahiro Yoshikawa, Sakai (JP); Mayumi Hori, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 14/396,565

(22) PCT Filed: Oct. 28, 2013

(86) PCT No.: PCT/JP2013/079142
§ 371 (c)(1),
(2) Date: Oct. 23, 2014

(87) PCT Pub. No.: WO2014/069405
PCT Pub. Date: May 8, 2014

(65) Prior Publication Data
US 2015/0078032 A1  Mar. 19, 2015

(30) Foreign Application Priority Data
Oct. 30, 2012 (JP) .................. 2012-239517

(51) Int. Cl.
*F21V 8/00* (2006.01)
*F21V 17/00* (2006.01)
*G02F 1/1333* (2006.01)
*G02F 1/1335* (2006.01)

(52) U.S. Cl.
CPC ........... *G02B 6/0055* (2013.01); *G02B 6/0051* (2013.01); *G02B 6/0085* (2013.01); *G02B 6/0088* (2013.01); *G02F 1/133308* (2013.01); *G02F 1/133615* (2013.01); *G02F 2001/133317* (2013.01); *G02F 2001/133322* (2013.01); *G02F 2201/465* (2013.01)

(58) Field of Classification Search
CPC   G02B 6/0051; G02B 6/0055; G02B 6/0085; G02B 6/0088; G02F 1/133308; G02F 2001/13332; G02F 2001/133322; G02F 2001/133328; G02F 2201/465; G02F 2001/133317; G02F 1/133615
See application file for complete search history.

(56) References Cited

U.S. PATENT DOCUMENTS

| | | | |
|---|---|---|---|
| 6,600,526 B2* | 7/2003 | Yano | G02B 6/0031 349/65 |
| 6,962,430 B2* | 11/2005 | Ito | G02B 6/0055 362/306 |
| 8,130,339 B2* | 3/2012 | Wu | G02B 6/0055 349/65 |
| 2006/0279216 A1* | 12/2006 | Kim | G02B 6/0055 313/631 |
| 2012/0050645 A1 | 3/2012 | Okada et al. | |

FOREIGN PATENT DOCUMENTS

JP   2012-048168   3/2012

* cited by examiner

*Primary Examiner* — Alan Cariaso
(74) *Attorney, Agent, or Firm* — Bret E. Field; Bozicevic, Field & Francis LLP

(57) ABSTRACT

A light source unit, comprising: a light guide plate; a light source facing to a peripheral surface of the light guide plate; and a reflection part reflecting light emitted from one surface of the light guide plate, wherein the reflection part comprises: an elongated portion, which is positioned at an outside of an edge of the light guide plate, being elongated in a direction crossing the one surface; and a protrusion portion, which is located at a position of the elongated portion that is away from the one surface, protruding from the position to the one surface, wherein the one surface side of the light source is covered with the protrusion portion.

11 Claims, 17 Drawing Sheets

F I G. 9
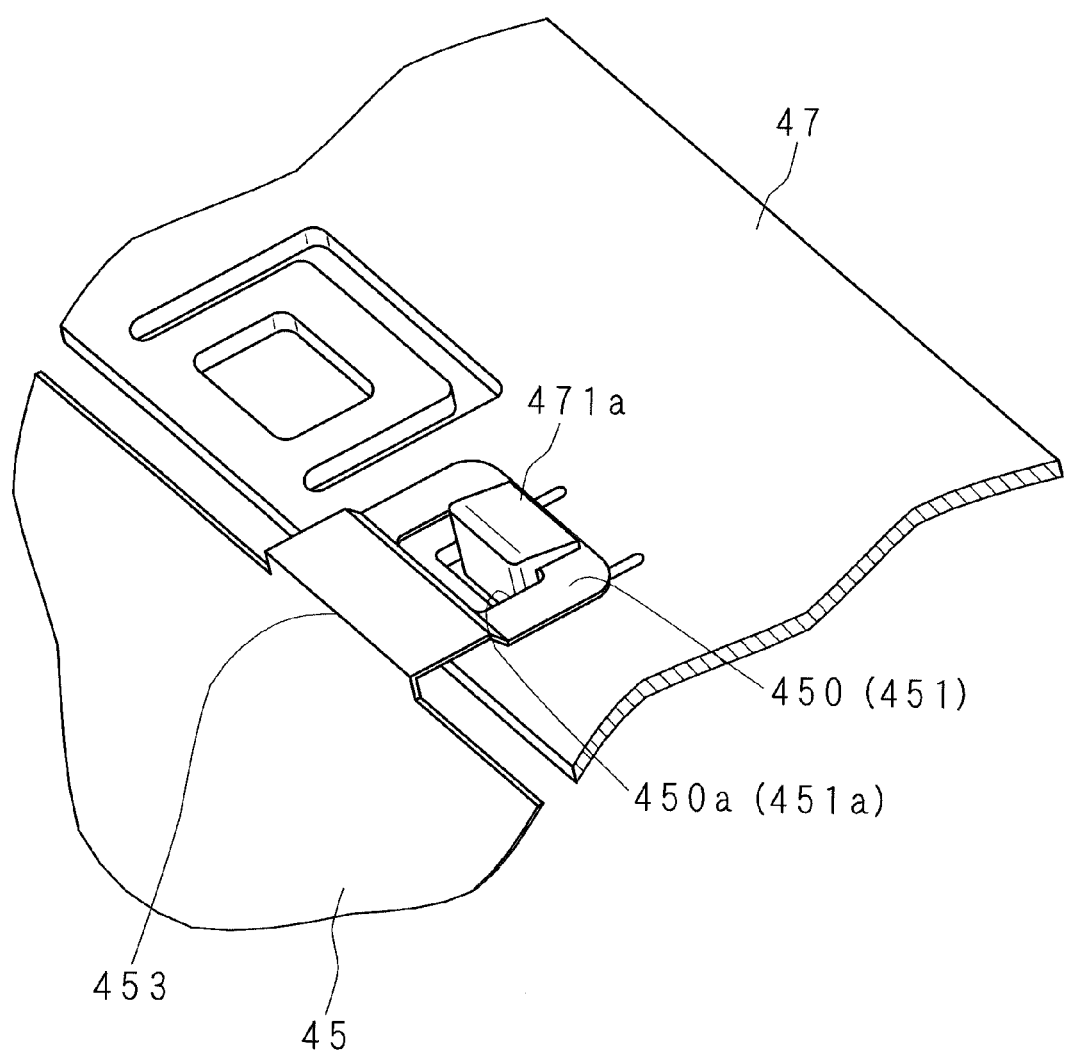

F I G. 14
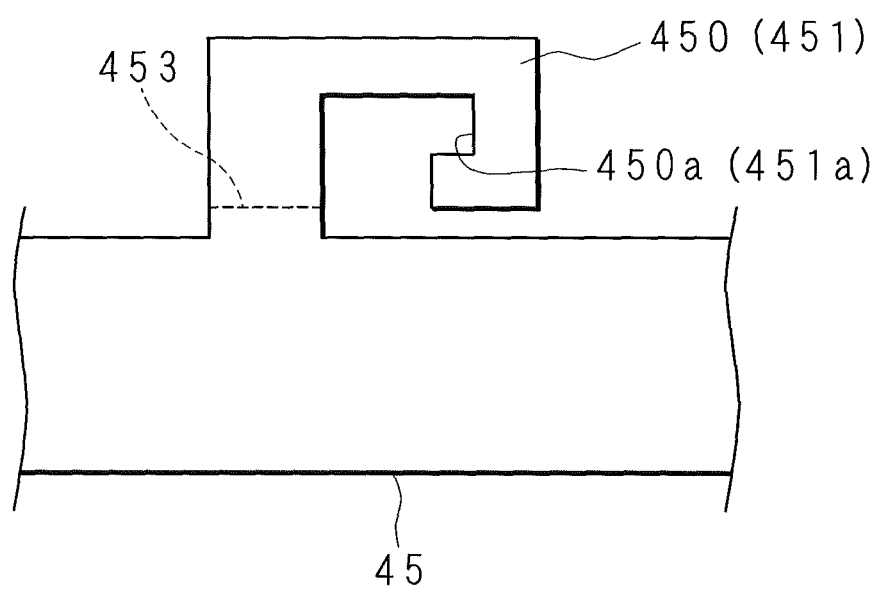

LIGHT SOURCE UNIT AND DISPLAY APPARATUS

CROSS-REFERENCE TO RELATED APPLICATIONS

This application is the national phase under 35 U.S.C. §371 of PCT International Application No. PCT/JP2013/79142 which has International filing date of Oct. 28, 2013, and designated the United States of America.

FIELD

The technology herein relates to a light source unit which irradiates light to an object and a display apparatus including the light source unit.

BACKGROUND AND SUMMARY

Generally, thin type display apparatuses which occupy a small area in comparison to a size of a display screen have been widely distributed. Many of the thin type display apparatuses display an image on a display panel by light from a backlight unit (a light source unit).

There are two types of light source unit, a direct type in which a light source unit such as a light emitting diode (LED) or a cold-cathode fluorescent tube is disposed to face the display panel, and an edge light type which includes a light guide plate facing the display panel and a light source facing a peripheral surface of the light guide plate. When using the direct type light source unit, there is no need to acquire a space for disposing the light source around a display unit, and it is possible to narrow frames of the display apparatus (for example, Japanese Patent Application Laid-Open No. 2012-48168).

Further thinning of the display apparatus is also required in addition to the narrowing of frame in recent years. Using the edge light type light source unit may be considered to meet the requirements of thinning, because it is easy for the edge light type light source unit to have a thinner light source unit compared to the direct type light source unit.

However, when manufacturing the edge light type light source unit, while maintaining the narrowing of frame, the light source disposed around the light guide plate, the chassis, and the like may be visible from an outside. Therefore, when manufacturing the edge light type light source, there is no choice but to widen the frame.

In consideration of the above-described circumstances, an example embodiment aims at a light source unit and a display apparatus, which are capable of satisfying both of the narrowing of frame and the thinning.

According to an example embodiment, there is provided a light source unit including a light guide plate, a light source facing to a peripheral surface of the light guide plate, and a reflection part reflecting light emitted from one surface of the light guide plate, characterized in that: the reflection part comprises: an elongated portion, which is positioned at an outside of an edge of the light guide plate, being elongated in a direction crossing the one surface; a protrusion portion, which is located at a position of the elongated portion that is away from the one surface, protruding from the position to the one surface, wherein the one surface side of the light source is covered with the protrusion portion.

In the light source unit according to an example embodiment, the protrusion portion may be inclined with respect to the one surface.

In the light source unit according to an example embodiment, the protrusion portion may have an inclination angle of 30 degrees or more but less than 90 degrees.

In the light source unit according to an example embodiment, a curved surface protruding in the direction crossing the one surface may be formed on the protrusion portion opposite to the one surface.

In the light source unit according to an example embodiment, the side of the protrusion portion opposite to the one surface may be formed in a stepped shape.

In the light source unit according to an example embodiment, the one surface may include a diffusion sheet disposed thereon to diffuse light.

The light source unit according to an example embodiment, may include: a diffusion plate which is separated from and disposed opposite to the one surface of the light guide plate to diffuse light; and a support part which is disposed between the diffusion plate and the light guide plate to support the diffusion plate, and which is translucent.

The light source unit according to an example embodiment, may include: a diffusion plate which is separated from and disposed opposite to the one surface of the light guide plate to diffuse light; an optical sheet overlapped on the diffusion plate; and a locking piece which is positioned outside of the diffusion plate from an edge portion of the one surface, extends from an edge of the optical sheet in a direction crossing the diffusion plate, and has a hole formed therein, wherein the reflection part has a protrusion part which is inserted into the hole.

The light source unit according to an example embodiment, may include: a diffusion plate which is separated from and disposed opposite to the one surface of the light guide plate to diffuse light; an optical sheet overlapped on the diffusion plate; and a locking piece which is positioned outside of the diffusion plate from the edge portion of the one surface, extends from the edge of the optical sheet in the direction crossing the diffusion plate, and has a hole, wherein the diffusion plate has a protrusion part which is inserted into the hole.

According to an example embodiment, there is provided a display apparatus including: the light source unit according to any one of the above; and a display panel which is configured to display an image by transmitting the light emitted from the light source unit, and is supported on the reflection part, wherein the reflection part supports the display panel at an outside of the display region of the display panel.

According to an example embodiment, there is provided a display apparatus including: the light source unit according to any one of the above; and a display panel which is configured to display an image by transmitting the light emitted from the light source unit, and is supported on the reflection part, wherein the light source is positioned within the display region of the display panel, and the protrusion portion is positioned between the light source and the display panel.

According to an example embodiment, there is provided a television receiving apparatus includes: the display apparatus according to any one of the above; and a receiving unit which receives television broadcasts, wherein the display apparatus is configured to display an image based on the television broadcasts received by the receiving unit.

According to an example embodiment, in the edge light type light source unit, the protrusion portion protruding to the one surface of the light guide plate is provided, and components such as a light source are positioned at the back side of the protrusion portion. In addition, since the light emitted from the one surface of the light guide plate is diffused by the protrusion portion, decreasing of luminance in the edge portion may be prevented, and both of the narrowing of frame and the thinning may be achieved.

BRIEF DESCRIPTION OF THE DRAWINGS

FIG. 9 is an enlarged perspective view schematically illustrating a non-limiting example of a hook and a locking piece.

FIG. 14 is a development view of the optical sheet for schematically illustrating a non-limiting example embodiment in which a part of the configuration of the locking piece and the positioning locking piece is changed.

DETAILED DESCRIPTION OF NON-LIMITING EXAMPLE

Embodiments

Embodiment 1

Figure 1:
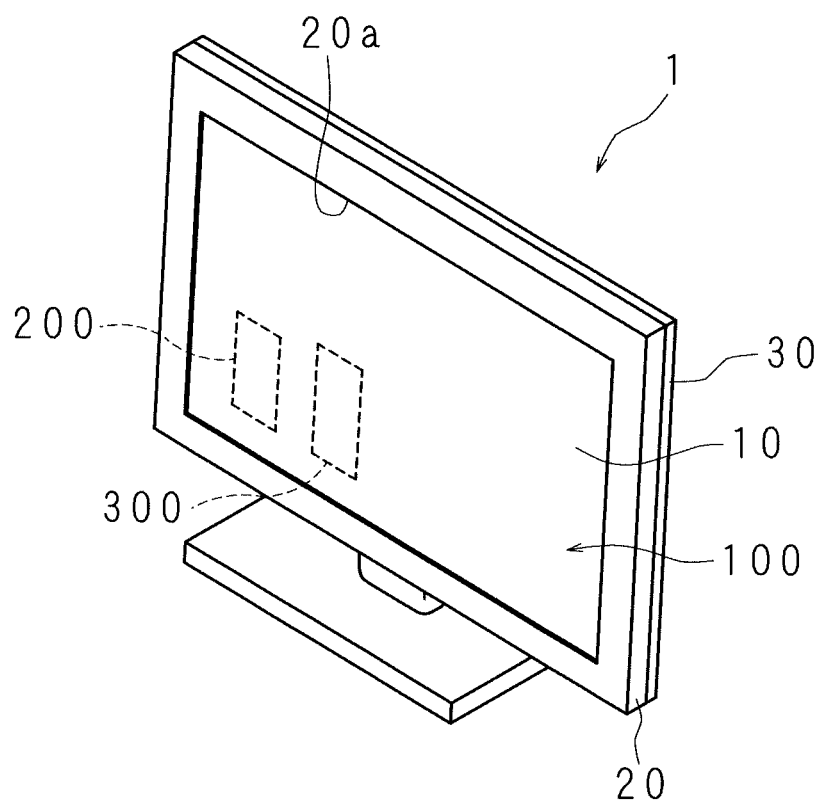
FIG. 1 is a perspective view schematically illustrating a non-limiting example of a television receiving apparatus according to Embodiment 1.

Hereinafter, a television receiving apparatus according to Embodiment 1 will be described in detail with reference to the accompanying drawings. FIG. 1 is a perspective view schematically illustrating a non-limiting example of the television receiving apparatus according to Embodiment 1.

FIG. 1 illustrates a television receiving apparatus 1. The television receiving apparatus 1 includes a display apparatus 100 for displaying an image thereon, a tuner 200 (a receiving unit) for receiving a broadcast wave from an antenna (not illustrated), and a decoder 300 for decoding the encoded broadcast wave. In the television receiving apparatus 1, the decoder 300 decodes the broadcast wave received by the tuner 200, and the display apparatus 100 displays the image thereon based on decoded information.

The display apparatus 100 includes a rectangular liquid crystal display panel 10, and a light source unit 40 to be described below. The liquid crystal display panel 10 is configured so as to adjust transmittance of light by controlling a voltage applied to a liquid crystal. The display apparatus 100 is housed between a front cabinet 20 and a rear cabinet 30 which are disposed in front and back with a display surface (a surface on which a user is viewing in a normal using mode) of the liquid crystal display panel 10 on a front side (Hereinafter, the surface on which the user is viewing in the normal using mode will be referred to as a front surface, and a surface opposite to the front surface will be referred to as a rear surface. In addition, the front surface side will be referred to as a front side, and the rear surface side will be referred to as a rear side). The front cabinet 20 is formed in a rectangular frame shape, and has a rectangular opening 20a formed at a center part thereof. The front cabinet 20 is made of, for example, aluminum.

The rear cabinet 30 is formed in a rectangular tray shape of which the front side is open, and is made of, for example, an electro galvanized steel sheet. Further, the front cabinet 20 and the rear cabinet 30 may be made of a resin member. The above-described tuner 200 and the decoder 300 are housed between the front cabinet 20 and the rear cabinet 30. Alternately, the tuner 200 and the decoder 300 may be disposed outside of the display apparatus 100 and connected to the display apparatus 100.

Figure 2:
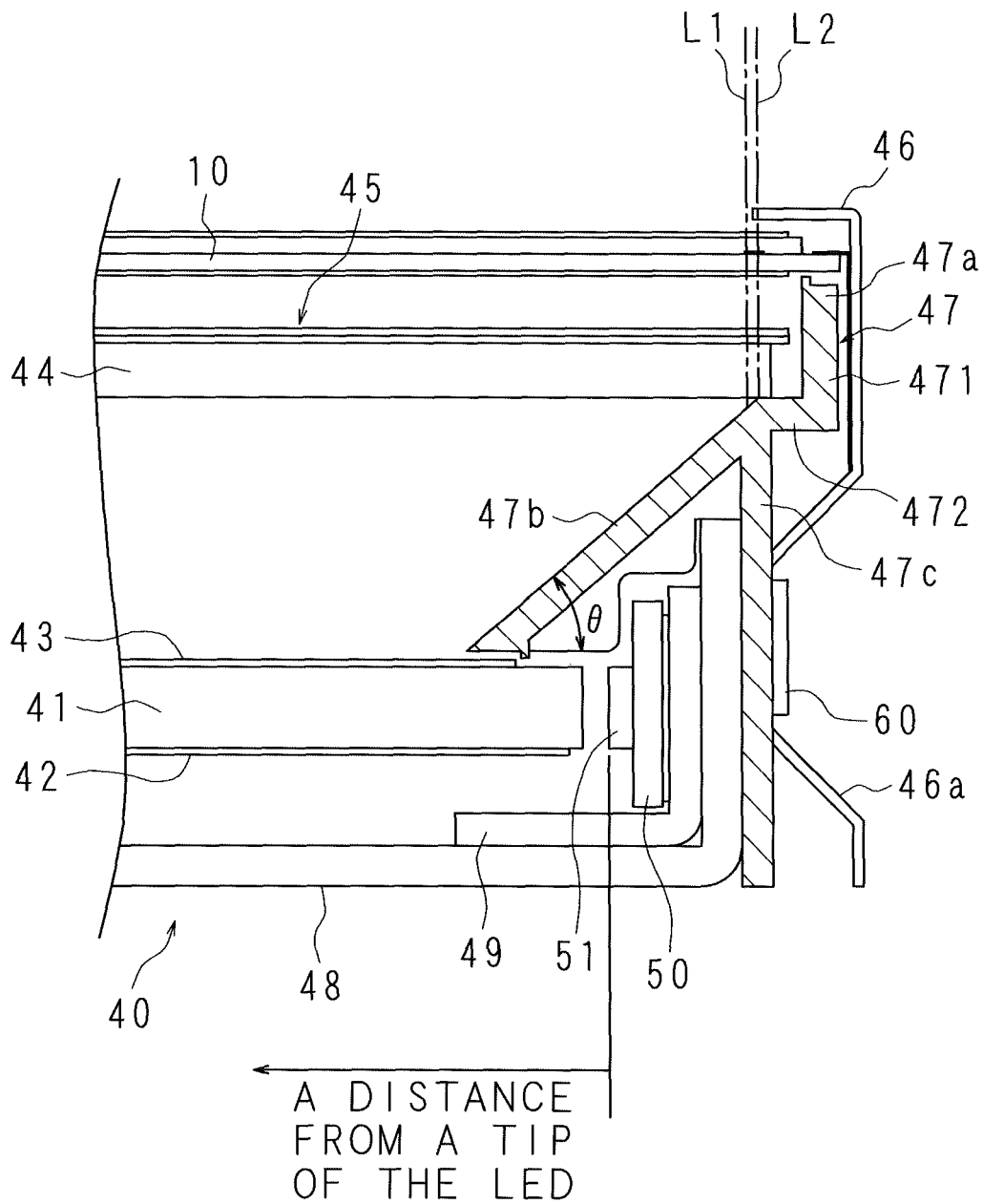
FIG. 2 is a partial cross-sectional view schematically illustrating a non-limiting example of an internal configuration of the television receiving apparatus.

FIG. 2 is a partial cross-sectional view schematically illustrating a non-limiting example of an internal configuration of the television receiving apparatus 1.

The display apparatus 100 includes the liquid crystal display panel 10 and the light source unit 40 for irradiating light to the liquid crystal display panel 10. The light source unit 40 includes a rectangular deep-dish shaped backlight chassis 48, a rectangular light guide plate 41 housed in the backlight chassis 48, and an LED 51 for irradiating light to the light guide plate 41.

The light guide plate 41 is supported on a bottom of the backlight chassis 48. The rear surface of the light guide plate 41 is provided with a reflection sheet 42 for reflecting light. The front surface (one surface) of the light guide plate 41 is covered with a diffusion sheet 43 for diffusing light.

An LED substrate 50 with a plurality of LEDs 51 mounted thereon is attached to a side of the backlight chassis 48 through a heat radiation plate 49. The LED 51 faces a peripheral surface of the light guide plate 41. Further, the LED substrate 50 may be directly attached to the side of the backlight chassis 48 without providing the heat radiation plate 49.

The front surface of the light guide plate 41 is covered with the diffusion sheet 43, and faces a rectangular diffusion plate 44 for diffusing light. The front surface of the diffusion plate 44 is covered with an optical sheet 45 for adjusting an emission direction of the light. The liquid crystal display panel 10 faces the front surface of the diffusion plate 44.

The liquid crystal display panel 10 and the diffusion plate 44 are supported by a panel chassis 47. The panel chassis 47 is a white rod-shaped body extending along an edge of the liquid crystal display panel 10.

The panel chassis 47 has a support body 47a of an L-shaped cross section to support the liquid crystal display panel 10 and the diffusion plate 44. The support body 47a includes a panel support portion 471 which faces a peripheral surface of the diffusion plate 44 and extends toward an edge portion of the liquid crystal display panel 10, and a diffusion plate support portion 472 which protrudes at a right angle from a rear side end of the panel support portion 471 to the diffusion plate 44 side, and faces the rear surface of the diffusion plate 44.

The front side end of the panel support portion 471 supports a rear edge part of the liquid crystal display panel 10. The diffusion plate support portion 472 supports a rear edge part of the diffusion plate 44. The liquid crystal display panel 10 and the diffusion plate 44 face with each other with a predetermined gap.

A protruding end of the diffusion plate support portion 472 is provided with an attaching plate 47c (an elongated portion) which protrudes to the rear side for attaching a bezel 46 which will be described below to the backlight chassis 48. In addition, the protruding end of diffusion plate support portion 472 is provided with a reflection plate 47b (a protrusion portion) which protrudes toward an inside of the diffusion plate 44 from the protruding end in a direction opposite to the panel support portion 471, and obliquely crossed with respect to the diffusion plate 44.

The attaching plate 47c is disposed on an outer surface of the backlight chassis 48. A front edge portion of the liquid crystal display panel 10, a peripheral surface of the liquid crystal display panel 10, and outer surfaces of the support body 47a and the attaching plate 47c are covered by the frame shaped bezel 46. The bezel 46 has a recess 46a at a portion facing the attaching plate 47c.

Through holes (not illustrated) are formed in the recess 46a and the attaching plate 47c, and a screw hole (not illustrated) corresponding to the through holes is formed in the backlight chassis 48. When a screw 60 is inserted into the respective through holes and screwed into the screw hole, the bezel 46, the panel chassis 47 and the backlight chassis 48 are connected with each other.

The heat radiation plate 49 and the LED substrate 50 are positioned on the rear side of the reflection plate 47b, and are concealed by the reflection plate 47b as seen from the front surface. In other words, the reflection plate 47b covers the front side of the LED 51. A tip part of the reflection plate 47b faces the front edge portion of the light guide plate 41, and the reflection plate 47b is inclined toward the outside of the edge of the light guide plate 41.

Figure 3:
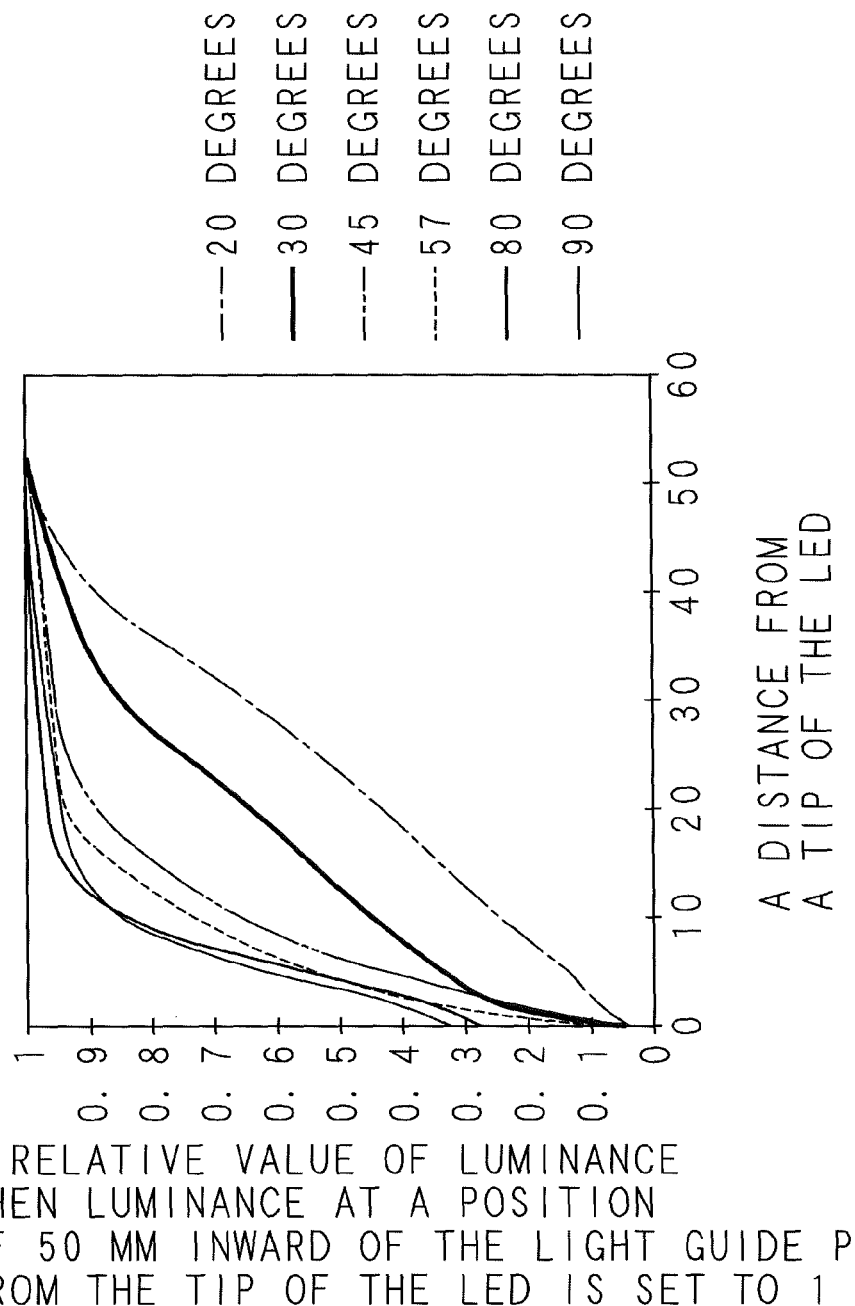
FIG. 3 is a graph illustrating a non-limiting example of a relationship between a distance from a tip of the LED in a direction toward an inside of a light guide plate and a relative value of luminance when luminance at a position of 50 mm inward of the light guide plate from the tip of the LED is set to 1.
Figure 4:
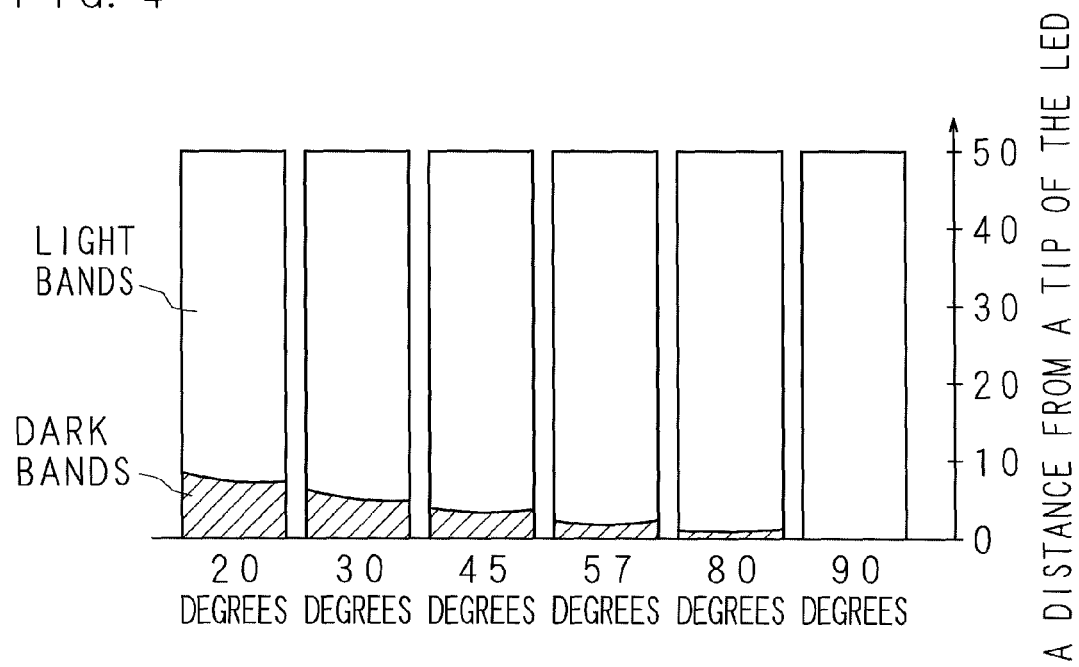
FIG. 4 is a schematic diagram illustrating a non-limiting example of a relationship between an inclination angle of a reflection plate and dark and light bands which are viewed on a display surface of a liquid crystal display panel.

Next, a relationship between an inclination angle $\theta$ (see FIG. 2) of the reflection plate 47b with respect to the front surface of the light guide plate 41 and luminance in the front surface of the liquid crystal display panel 10 will be described. FIG. 3 is a graph illustrating a non-limiting example of a relationship between a distance from a tip of the LED 51 in a direction toward an inside of the light guide plate 41 and a relative value of luminance when luminance at a position of 50 mm inward of the light guide plate 41 from the tip of the LED 51 is set to 1. Further, the distance from the tip of the LED 51 to the tip of the reflection plate 47b is sufficiently smaller than 50 mm, for example, 25 mm or less. FIG. 4 is a schematic diagram illustrating a non-limiting example of a relationship between an inclination angle of the reflection plate 47b and dark and light bands which are viewed on the display surface of the liquid crystal display panel 10. In FIG. 4, a hatched portion represents the dark band, while a portion without hatching represents the light band.

As illustrated in FIG. 3, when the inclination angle $\theta$ is 20 degrees, the relationship between the distance from the tip of the LED 51 and the relative value of the luminance is in a substantially proportional relationship, and as the distance from the tip of the LED 51 is increased from 0 to 50 mm, the relative value of the luminance is increased from substantially 0 to 1. When the inclination angle $\theta$ is 30 degrees, an inclination in a range between 0 to 10 mm of the distance from the tip of the LED 51 is larger than the case that the inclination angle $\theta$ is 20 degrees. In addition, at a position in which the distance from the tip of the LED 51 is 10 mm, when the inclination angle $\theta$ is 20 degrees, the relative value of the luminance is substantially 0.25, but when the inclination angle $\theta$ is 30 degrees, the relative value of the luminance is substantially 0.45. As illustrated in FIG. 4, when the inclination angle $\theta$ is 30 degrees, an area occupied by the dark band in the distance range of 0 to 10 mm is smaller than the case that the inclination angle $\theta$ is 20 degrees, and the distance is closer to 0 mm (is closer to the edge side of the liquid crystal display panel 10), thereby it is difficult for the dark band to be recognized by the user.

The relative value of the luminance at a position in which the distance from the tip of the LED 51 is 10 mm is, when the inclination angle $\theta$ is 45 degrees, substantially 0.7, when the inclination angle $\theta$ is 57 degrees, substantially 0.75, and when the inclination angle $\theta$ is 80 or 90 degrees, substantially 0.88. In either case, the relative value of the luminance is greatly improved, and the area occupied by the dark band in the distance range of 0 to 10 mm is smaller than the case that the inclination angle $\theta$ is 30 degrees, and further the distance is closer to a position of 0 mm, thereby it is more difficult for the dark band to be recognized by the user.

Therefore, considering the luminance in the front surface of the liquid crystal display panel 10, it is preferable that the inclination angle $\theta$ of the reflection plate 47b is determined in a range of 30 degrees or more but less than 90 degrees, more preferably, 45 degrees or more but less than 90 degrees.

The liquid crystal display panel 10 has a larger area than the diffusion plate 44. The diffusion plate 44 faces the center part of the liquid crystal display panel 10, and the edge of the liquid crystal display panel 10 is positioned outside from the diffusion plate 44. The liquid crystal display panel 10 includes a display region displaying an image and a non-display area not displaying the image. The display region occupies the center part of the liquid crystal display panel 10, while the non-display region is positioned at a peripheral edge part of the liquid crystal display panel 10. In FIG. 2, L1 represents a boundary between the display region and the non-display region, and the inside from the L1 is the display region (a left side in FIG. 2), while the outside (a right side in FIG. 2) thereof is the non-display region.

A place in which the reflection plate 47b is continued to the diffusion plate support portion 472 is positioned outside from the display region of the liquid crystal display panel 10. L2 in FIG. 2 represents a position of the place in a direction parallel to the liquid crystal display panel 10. Herein, L2 is positioned outside from L1, and is positioned in the non-display region.

The light emitted from the LED 51 is incident on the light guide plate 41, and the light is dispersedly emitted from the entire front surface of the light guide plate 41 by repeatedly proceeding a total reflection by the reflection sheet 42 on the rear surface of the light guide plate and a partial reflection by the front surface thereof. The emitted light is diffused by the diffusion sheet 43, and is irradiated to the diffusion plate 44. When the light diffused by the diffusion sheet 43 has reached the reflection plate 47b, it is reflected by the reflection plate 47b so as to be irradiated to the diffusion plate 44. The light irradiated onto the diffusion plate 44 is diffused through the optical sheet 45 to display an image on the liquid crystal display panel 10.

In the television receiving apparatus 1 according to Embodiment 1, the LED substrate 50 and the heat radiation plate 49 are positioned in the display region, but are concealed by the reflection plate 47b. Since the light emitted from the front surface of the light guide plate 41 is reflected by the reflection plate 47b, shadows caused by the reflection plate 47b may not appear on the liquid crystal display panel 10, and decreasing of the luminance on a portion facing the reflection plate 47b in the liquid crystal display panel 10 may be prevented.

Since the reflection plate 47b is inclined, the light which has reached the reflection plate 47b may be reflected efficiently to the front surface. In addition, by setting the inclination angle θ of the reflection plate 47b to be greater than 20 degrees and smaller than 70 degrees, even if the reflection plate 47b is positioned in the display region of the liquid crystal display panel 10, the luminance of the liquid crystal display panel 10 may be maintained.

In addition, since the diffusion sheet 43 is provided on the front surface of the light guide plate 41, the light emitted from the light guide plate 41 faces to the reflection plate 47b, and thereby allowing more light to be reflected by the reflection plate 47b. Further, since the diffusion plate 44 is provided between the liquid crystal display panel 10 and the light guide plate 41, it is possible to ensure uniform light incident on the liquid crystal display panel 10, and prevent an appearance of shadows caused by the reflection plate 47b.

In addition, since the panel support portion 471 supports the liquid crystal display panel 10 and the diffusion plate 44 outside of the display region, shadows caused by the panel support portion 471 does not appear on the liquid crystal display panel 10. Further, since the LED 51 is positioned in the display region, but is concealed by the reflection plate 47b, it is possible to achieve the thinning of the display apparatus, and prevent the LED 51 from being viewed. Furthermore, it is possible to easily achieve the narrowing of the edge light type light source unit 40, as compared to the direct type light source unit.

Figure 5:
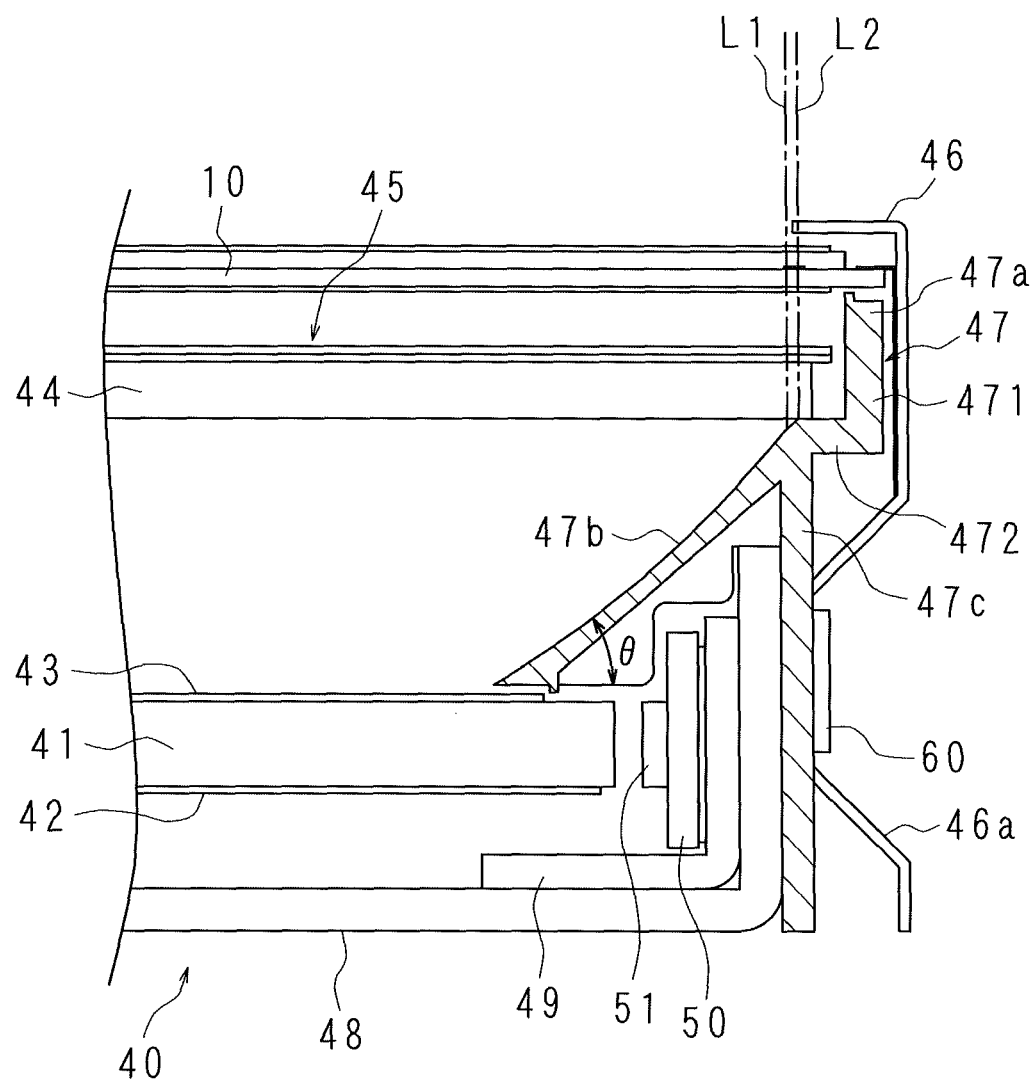
FIG. 5 is a partial cross-sectional view schematically illustrating a non-limiting example of the internal configuration of a display apparatus according to a first modified embodiment.

A part of the configuration of the television receiving apparatus 1 according to Embodiment 1 may be changed as illustrated and described below. FIG. 5 is a partial cross-sectional view schematically illustrating a non-limiting example of the internal configuration of a display apparatus according to a first modified embodiment. As illustrated in FIG. 5, a reflection plate 47b having a curved reflection surface may be used. In this case, the curvature of the curved surface may be appropriately set in consideration of reflection efficiency. As long as the light is reflected, the reflection surface may be either a convex surface or a concave surface.

Figure 6:
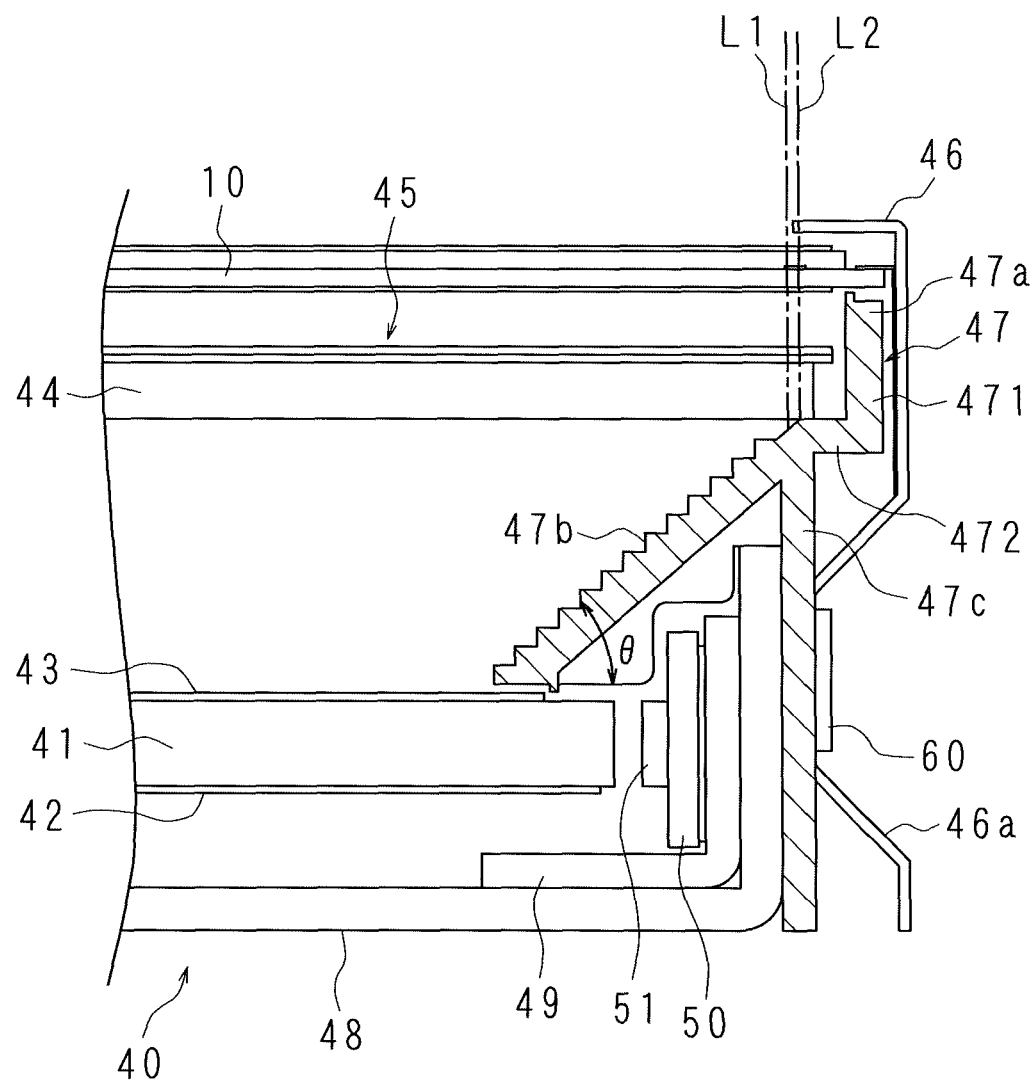
FIG. 6 is a partial cross-sectional view schematically illustrating a non-limiting example of the internal configuration of a display apparatus according to a second modified embodiment.

FIG. 6 is a partial cross-sectional view schematically illustrating a non-limiting example of the internal configuration of a display apparatus according to a second modified embodiment. As illustrated in FIG. 6, a reflection plate 47b having a stepped reflection surface may be used. In this case, the number of the steps, the height of the steps, and the width of the steps may be appropriately set in consideration of the reflection efficiency.

Further, when two facing edge portions of the liquid crystal display panel 10 are support by the panel chassis 47 and 47, in order to ensure uniformity of the luminance, it is preferable that both panel chassis 47 and 47 may have a symmetric shape. The color of the panel chassis 47 may be any color capable of reflecting light, without being particularly limited to white, and it may be silver, for example.

Embodiment 2

Figure 7:
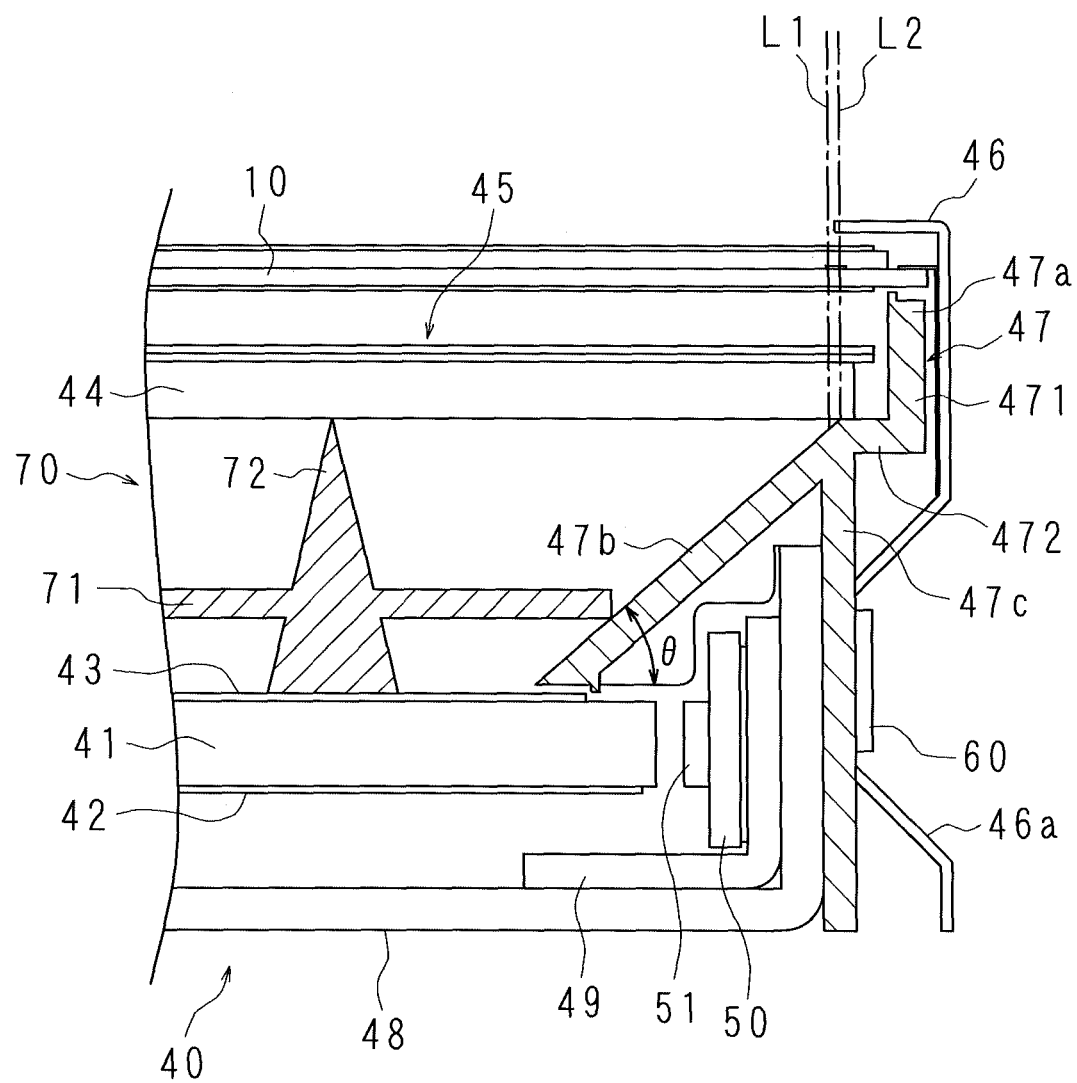
FIG. 7 is a partial cross-sectional view schematically illustrating a non-limiting example of the internal configuration of a television receiving apparatus according to Embodiment 2.

Hereinafter, a television receiving apparatus 1 according to Embodiment 2 will be described in detail with reference to the accompanying drawings. FIG. 7 is a partial cross-sectional view schematically illustrating a non-limiting example of the internal configuration of the television receiving apparatus according to Embodiment 2.

The television receiving apparatus 1 includes a support body 70 (a support part) which is disposed between the diffusion plate 44 and the light guide plate 41 so as to support the diffusion plate 44. The support body 70 includes a base plate 71 parallel to the diffusion plate 44, and a support pin 72 which is integrally molded with the base plate 71. The support pin 72 is formed in a cone shape, and protrudes in a direction crossing both surfaces of the base plate 71. The support pin 72 and the base plate 71 are translucent.

The support body 70 is disposed between the diffusion plate 44 and the light guide plate 41 in such a manner that a sharp end side of the support pin 72 faces the diffusion plate 44 and the other side thereof is placed on the light guide plate 41. A gap is formed between the sharp end of the support pin 72 and the diffusion plate 44. For example, a gap of 0.5 mm or more is formed therebetween. Further, an edge portion of the base plate 71 is locked to an inclined plate 47b.

Even when the diffusion plate 44 is bent due to its own weight, the diffusion plate 44 is supported by the support pin 72, and thereby decreasing of display quality due to the bending of the diffusion plate 44 may be prevented. In addition, since the base plate 71 and the support pin 72 are translucent, an appearance of shadows onto the liquid crystal display panel 10 may be prevented.

Further, the base plate 71 and the support pin 72 are not limited to the integral molding. For example, a through hole may be formed in the base plate 71, and the support pin 72 may be inserted into the through hole to be held therein.

The same parts of the configuration according to Embodiment 2 as those in Embodiment 1 will be denoted by the same reference numerals, and will not be described.

Embodiment 3

Figure 8:
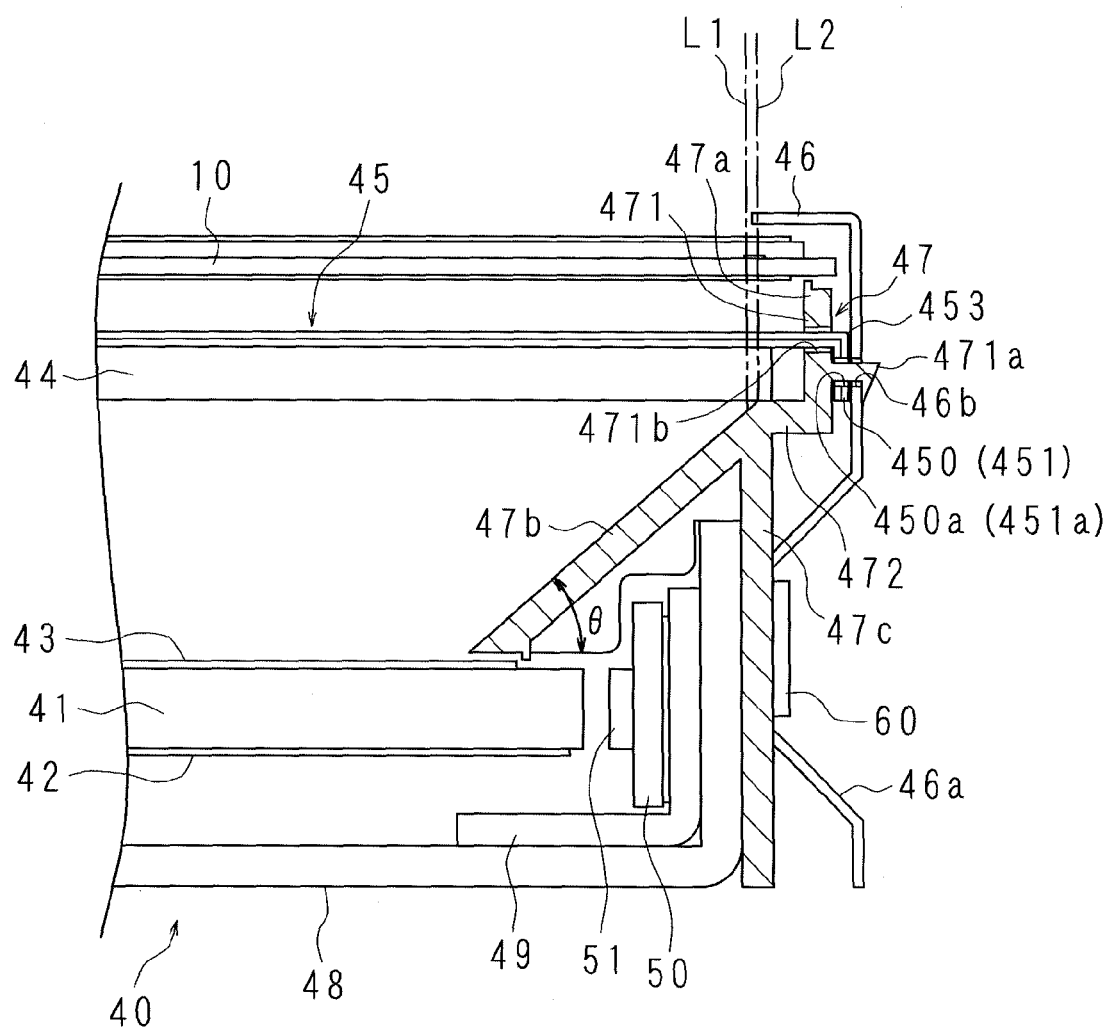
FIG. 8 is a partial cross-sectional view schematically illustrating a non-limiting example of the internal configuration of a television receiving apparatus according to Embodiment 3.
Figure 10:
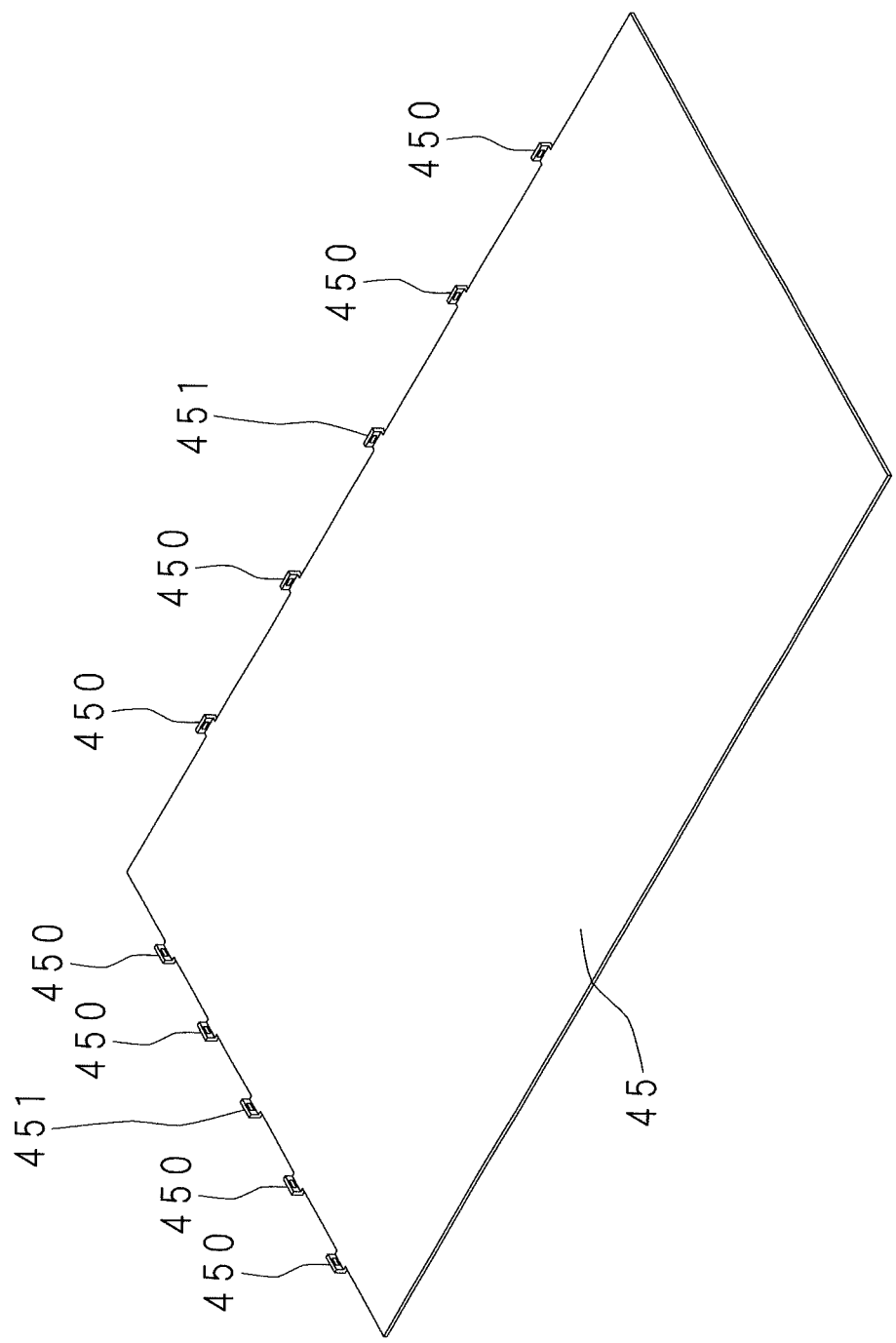
FIG. 10 is a perspective view of a non-limiting example of an optical sheet as seen from a rear side thereof.
Figure 11:
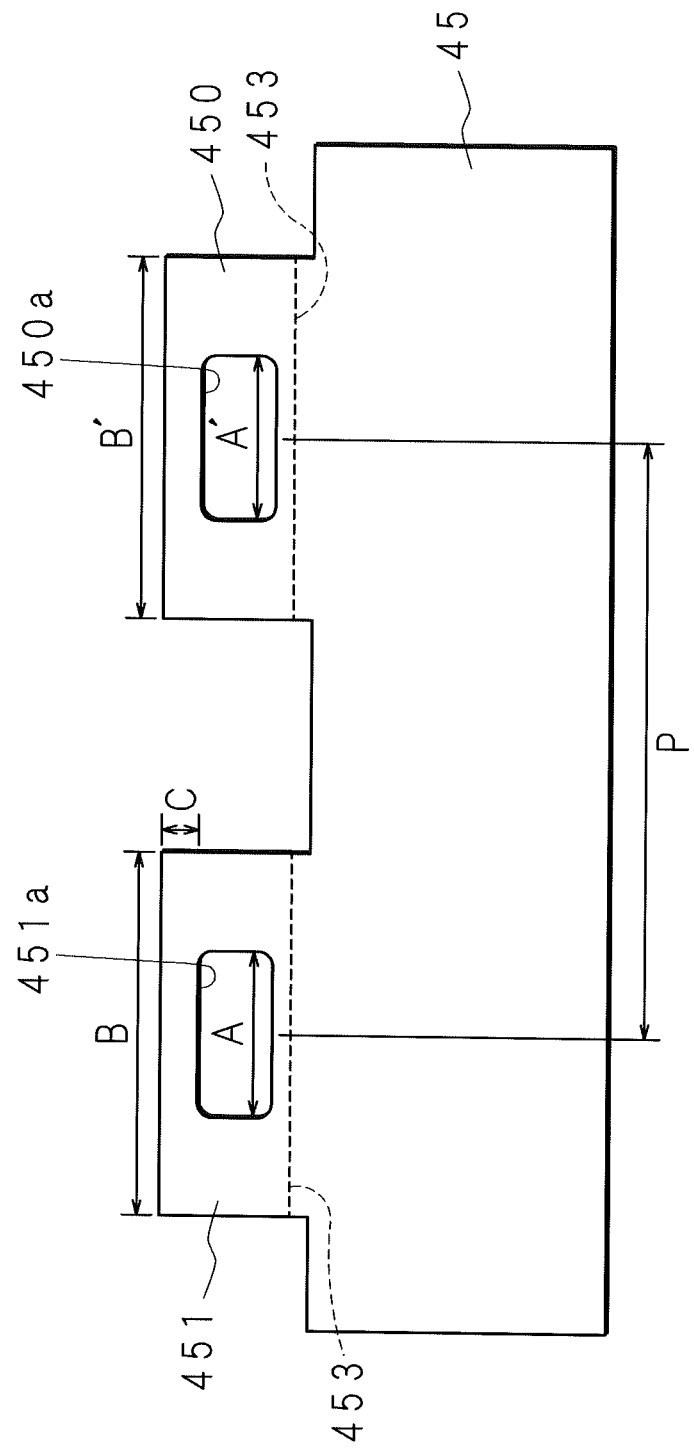
FIG. 11 is an enlarged development view of a non-limiting example of the optical sheet.

Hereinafter, a television receiving apparatus 1 according to Embodiment 3 will be described in detail with reference to the accompanying drawings. FIG. 8 is a partial cross-sectional view schematically illustrating a non-limiting example of the internal configuration of the television receiving apparatus 1, FIG. 9 is an enlarged perspective view schematically illustrating a non-limiting example of a hook 471a and a locking piece, FIG. 10 is a perspective view of a non-limiting example of an optical sheet 45 as seen from a rear side thereof, and FIG. 11 is an enlarged development view of a non-limiting example of the optical sheet 45. In FIG. 11, dimensions of each part of the optical sheet 45 are illustrated by A to C, A', B', and P.

As illustrated in FIGS. 8 and 9, an L-shaped hook 471a (a protrusion part) protrudes outward from an outer surface of a panel support portion 471. The hook 471a includes a portion protruding outward from the outer surface of the panel support portion 471, and a portion which protrudes rearward from the protrusion end of the portion, and has an outer surface which is inclined so as to be narrowed toward the rear side. In the front side portion from the hook 471a of the panel support portion 471, a plurality of insertion holes 471b, into which positioning locking pieces 450 or locking pieces 451 to be described below are inserted, are arranged to the panel support portion 471 in order.

A vertical width and horizontal width of the optical sheet 45 is equal to or greater than those of the diffusion plate 44. As illustrated in FIGS. 10 and 11, the positioning locking pieces 451 are provided at center parts of an edge portion of the optical sheet 45, and the same number of the locking pieces 450 are distributedly disposed on both sides of the positioning locking piece 451. The positioning locking pieces 451 and the locking pieces 450 extend from an edge of the optical sheet 45. The locking piece 450 is formed in an elongated rectangular shape in a direction along the edge of the optical sheet 45. The locking piece 450 may be provided on one side or a plurality of sides of the optical sheet 45.

The positioning locking pieces 451 and the locking pieces 450 are provided with through holes 450a and 451a which are formed at center parts thereof in an elongated rectangular shape in a direction along the edge of the optical sheet 45. Four corners of the through holes 450a and 451a are chamfered and curved. Pitches P between the positioning locking pieces 451 and the locking pieces 450 are set to 150 mm or more. Perforations 453 are formed on the positioning locking pieces 451 and the locking pieces 450. The perforations 453 are positioned at a boundary between the positioning locking pieces 451 and locking pieces 450 and the edge of the optical sheet 45, or at the positioning locking pieces 451 or the locking pieces 450 next to the boundary.

A longitudinal dimension A of the through hole 451a of the positioning locking piece 451 is 0.3 mm longer than that of the hook 471a in the direction along the edge of the optical sheet 45. A longitudinal dimension B of the positioning locking piece 451 is at least 6 mm longer than the longitudinal dimension A of the through hole 451a. A dimension C between an outer edge of the positioning locking piece 451 and an edge of the through hole 451a is 1.5 mm or more.

A longitudinal dimension A' of the through hole 450a of the locking piece 450 is longer than the longitudinal dimension A of the through hole 451a of the positioning locking piece 451. A longitudinal dimension B' of the locking piece 450 is equal to or longer than the longitudinal dimension B of the positioning locking piece 451. Further, a dimension between an outer edge of the locking piece 450 and an edge of the through hole 450a is equal to the dimension C.

As illustrated in FIG. 8, the locking piece 450 and the positioning locking piece 451 are inserted into the insertion holes 471b, so that the perforations 453 are positioned outside from the panel support portion 471. In addition, as illustrated in FIGS. 8 to 10, the locking piece 450 and the positioning locking piece 451 are folded to the rear side with the perforation 453 as a folding line, so that the hook 471a is inserted into the through holes 450a and 451a. The hook 471a is locked to the edge portion of the through holes 450a and 451a. The optical sheet 45 is supported by the locking of the locking piece 450 and the positioning locking piece 451 with the hook. The bezel 46 has a through hole 46b at a portion corresponding to the hook 471a, and the hook 471a is inserted into the through hole 46b. Further, it is preferable that a front-back dimension of the hook 471a is 5 mm or more for locking the optical sheet 45. In addition, by inserting the hook 471a into the through hole 451a of the positioning locking piece 451, the optical sheet 45 is positioned.

As described above, the longitudinal dimension A of the through hole 451a is 0.3 mm longer than that of the hook 471a, and the longitudinal dimension A' of the through hole 450a is longer than the longitudinal dimension A. Therefore, as illustrated in FIG. 9, a clearance may be formed between the edges of the through holes 450a and 451a and the hook 471a. In addition, since the longitudinal dimension A' of the through hole 450a of the locking piece 450 is longer than the longitudinal dimension A of the through hole 451a of the positioning locking piece 451, even if the optical sheet 45 is thermally expanded or contracted, wrinkles are not generated on the optical sheet 45

As illustrated in FIG. 9, by abutting outer edge portions of the through holes 450a and 451a with the hook 471a, the optical sheet 45 is supported by the hook 471a. A load of the optical sheet 45 is dispersed by the plurality of hooks 471a, 471a, . . . , and 471a.

The locking piece 450 and the positioning locking piece 451 are folded to the back side of the diffusion plate 44, and the hook 471a is inserted into the through holes 450a and 451a, thereby the optical sheet 45 is locked with respect to the panel chassis. Therefore, the optical sheet 45 may cover the entire front surface of the diffusion plate 44. When the television receiving apparatus 1 is vertically disposed so that the hook 471a and the locking piece 450 are positioned on the upper side, the optical sheet 45 may be hung on the front surface of the diffusion plate 44 due to the weight of the optical sheet 45.

Since the edge of the optical sheet 45 can be positioned equal to the edge of the diffusion plate 44 or outside therefrom, the optical sheet 45 may cover the entire diffusion plate 44 to prevent light leakage. In addition, since the edge portion of the optical sheet 45 covers the edge of the diffusion plate 44 and is hidden by the bezel 46, when a user is viewing the television receiving apparatus 1 from an oblique direction with respect to the liquid crystal display panel 10, the edge of the optical sheet 45 is not visible, and thereby display quality may be improved.

Figure 12:
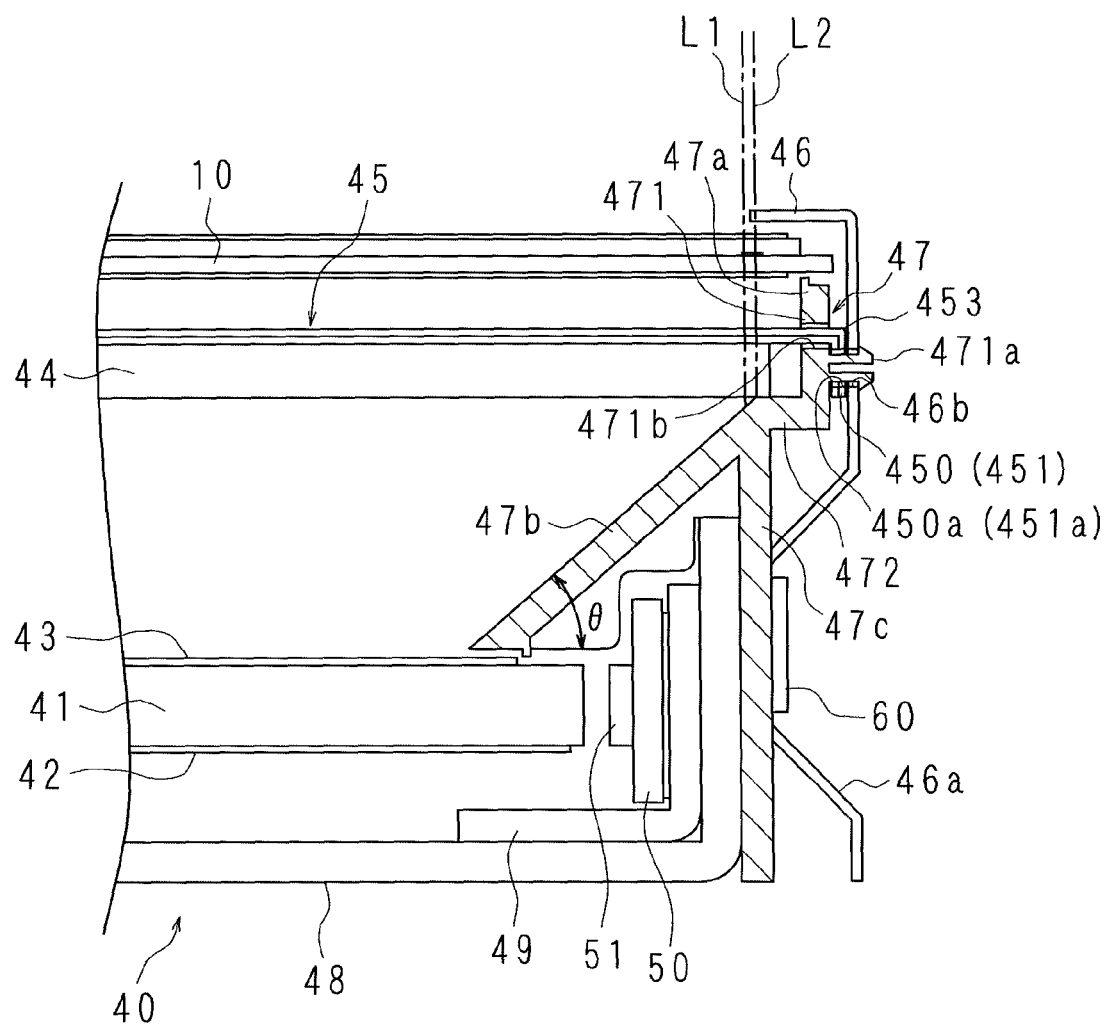
FIG. 12 is a partial cross-sectional view illustrating a non-limiting example embodiment in which a part of the configuration of the hook is changed.
Figure 13:
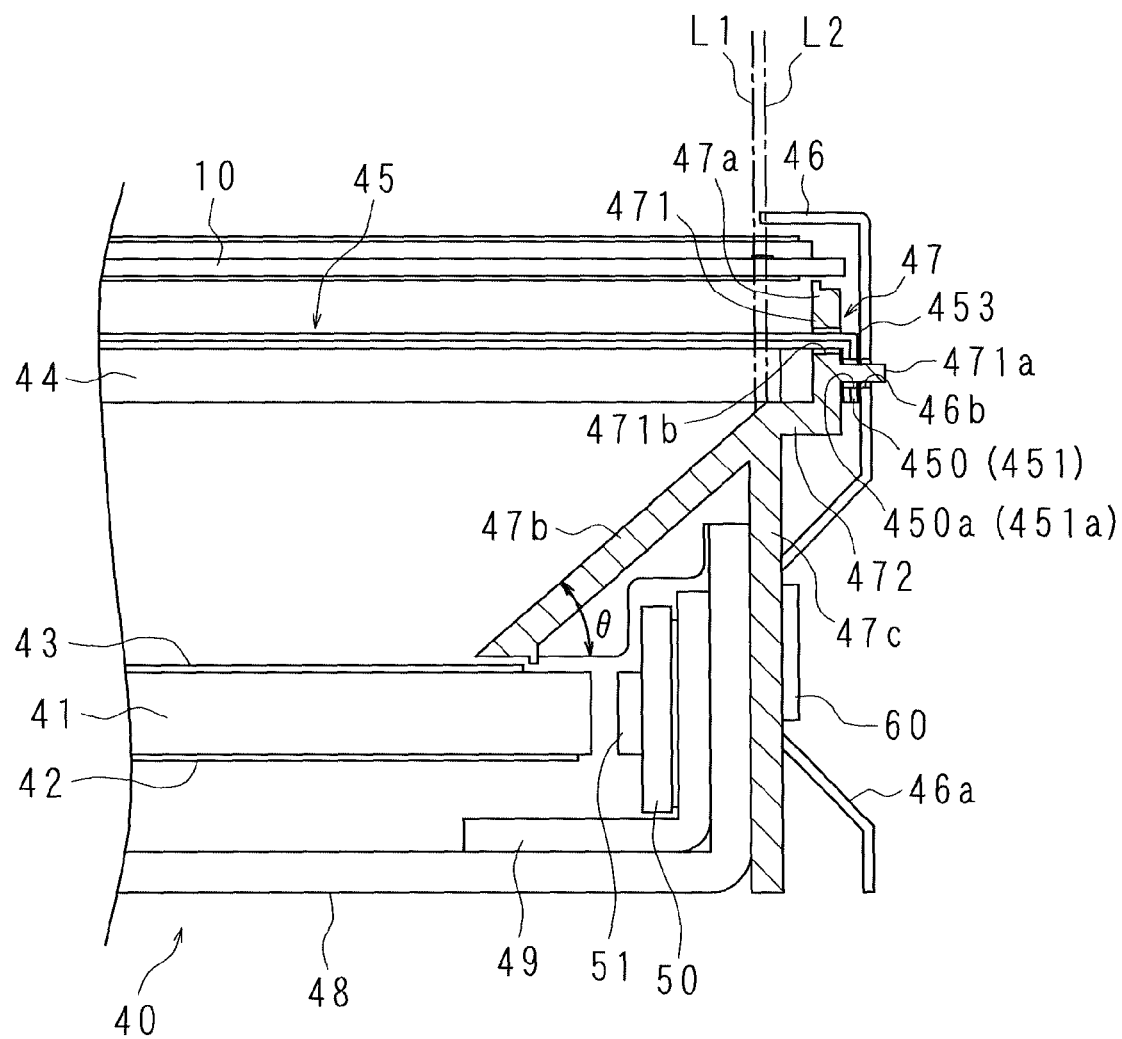
FIG. 13 is a partial cross-sectional view illustrating a non-limiting example embodiment in which a part of the configuration of the hook is changed.

A part of the configuration of the television receiving apparatus 1 according to Embodiment 3 may be changed as illustrated and described below. FIGS. 12 and 13 are partial cross-sectional views illustrating embodiments in which a part of the configuration of the hook 471a is changed mode, respectively.

As illustrated in FIG. 12, the hook 471a may be formed in a T shape. In this case, the hook 471a is provided with a shaft portion which protrudes outward from a side of the panel support portion 471 and has a slotted hole which is formed in a protrusion end part thereof and is open outward, and portions which protrude to the front side and the rear side from the two end parts of the shaft portion, respectively. Due to the slotted hole, the hook 471a may have high flexibility, and the hook 471a may be inserted into the through holes 450a and 451a even if the sharp end of the hook 471a has a larger diameter than that of the through holes 450a and 451a.

In addition, as illustrated in FIG. 13, the hook 471a may be formed in an I shape. In this case, the hook 471a is provided with only a portion protruding outward from the side of the panel chassis 47.

Figure 15:
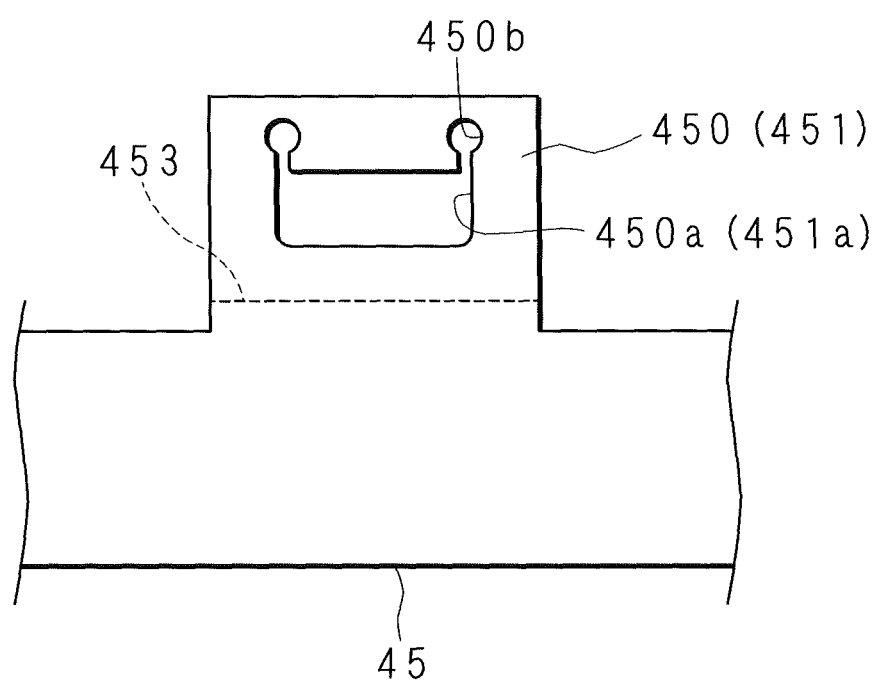
FIG. 15 is a development view of the optical sheet for schematically illustrating a non-limiting example embodiment in which a part of the configuration of the locking piece and the positioning locking piece is changed.

FIGS. 14 and 15 are development views of the optical sheet 45 schematically illustrating embodiments in which a part of the configuration of the locking piece 450 and the positioning locking piece 451 is changed, respectively. As illustrated in FIG. 14, the locking piece 450 and the positioning locking piece 451 may be formed in a hook shape. In this case, the hook 471a is inserted into a hook-shaped center portion. In addition, a second through hole 450b may be formed on an outside of a rectangular through hole 450a. For example, as illustrated in FIG. 15, a circular hole, and the second through hole 450b communicating with the circular hole through the through hole 450a may be formed in the optical sheet. In this case, due to the second through hole 450b, the outer edge portion of the through hole 450a may be easily bent, and the hook 471a may be easily inserted into the through hole 450a.

Figure 16:
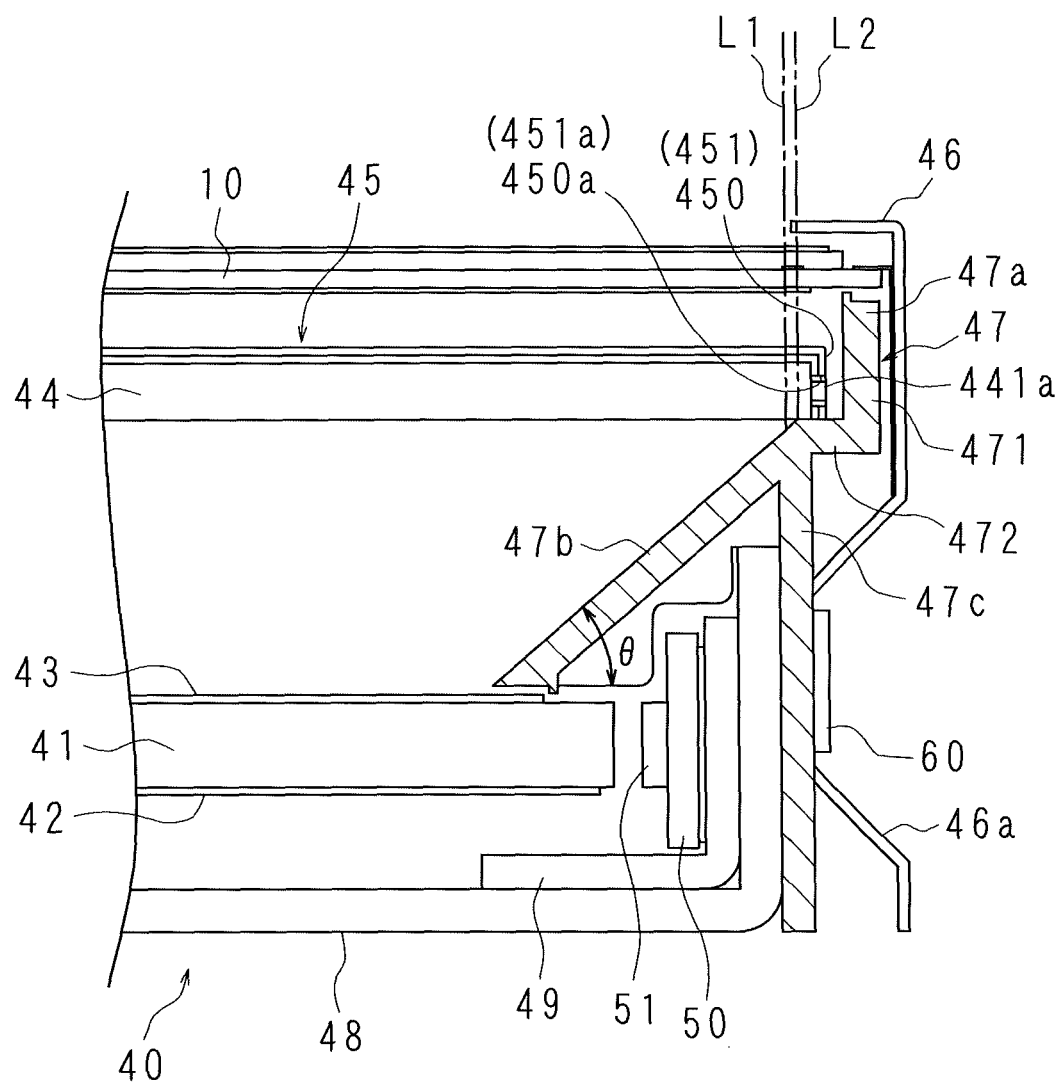
FIG. 16 is a partial cross-sectional view schematically illustrating a non-limiting example of the internal configuration of a display apparatus in which a part of the configuration of the diffusion plate is changed.

FIG. 16 is a partial cross-sectional view schematically illustrating a non-limiting example of the internal configuration of a display apparatus in which a part of the configuration of the diffusion plate 44 is changed. As illustrated in FIG. 16, a hook 441a protrudes outward from the peripheral surface of the diffusion plate 44. In this case, the locking piece 450 and the positioning locking piece 451 are positioned between the peripheral surface of the diffusion plate 44 and a P chassis, while the hook 441a is inserted into the through holes 450a and 451a of the locking piece 450 and the positioning locking piece 451.

Figure 17:
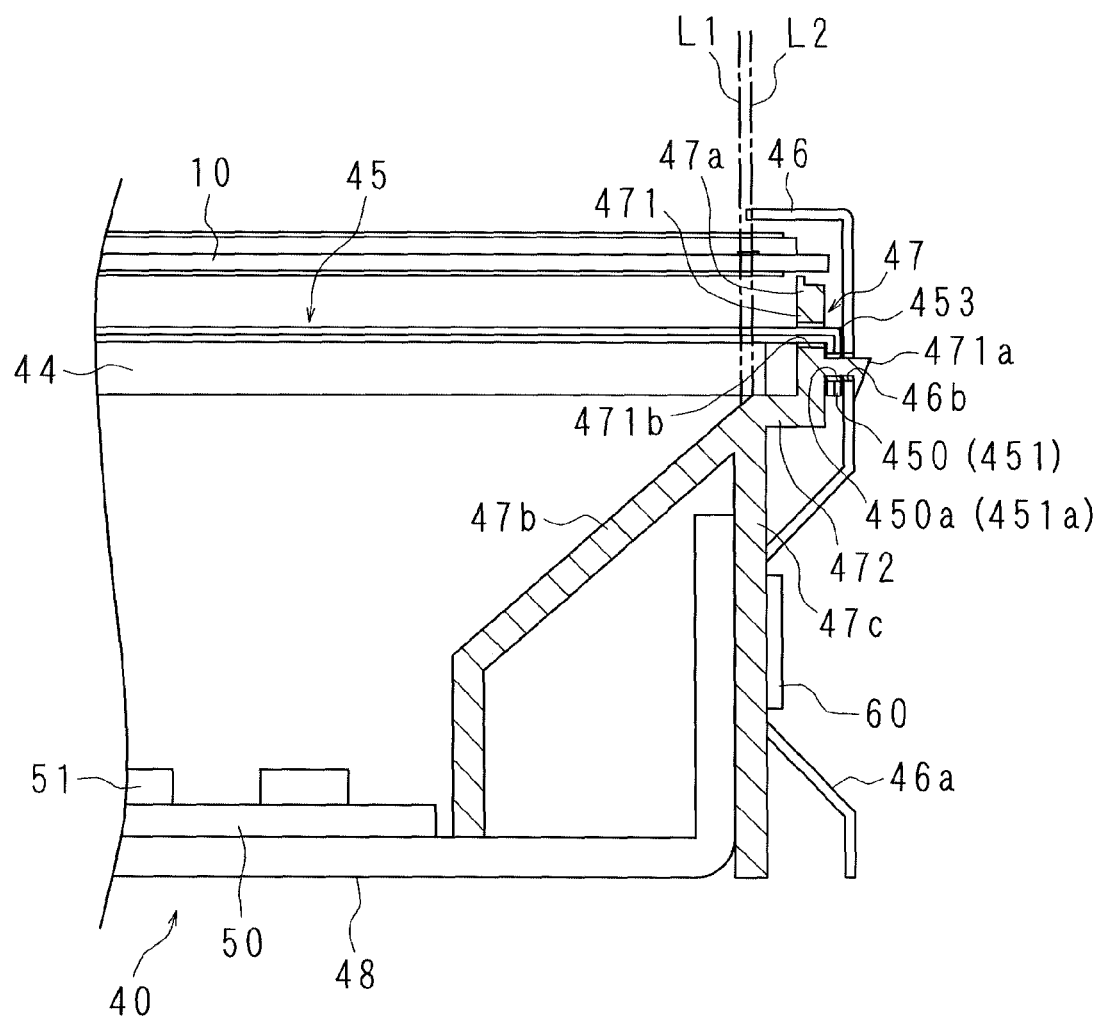
FIG. 17 is a partial cross-sectional view schematically illustrating a non-limiting example of the internal configuration of a display apparatus in which the locking piece and the hook are applied to a direct type light source unit.

Further, the locking piece 450, the positioning locking piece 451 and the hooks 471a and 441a may be applied not only to the edge light type light source unit 40, but also to a direct type light source unit 40, as illustrated in FIG. 17. In this case, the light source, for example, the LED substrate 50 mounted with LED 51 is fixed to the bottom of the backlight chassis 48.

When the optical sheet 45 is formed of a plurality of sheets, the locking piece 450 is provided on the optical sheet 45 closest to the liquid crystal display panel 10, while the other optical sheet 45 may not be provided with the locking piece 450 or may be provided with the locking piece 450 fewer than the optical sheet 45 closest to the liquid crystal display panel 10. The reason is that, if the optical sheet 45 closest to the liquid crystal display panel 10 is locked, it is possible to prevent the other optical sheet 45 from releasing to the outside. Of course, all the optical sheets 45 may be provided with the same number of locking pieces 450 as each other. In addition, the positioning locking piece 451 and the locking piece 450 may be provided with an even number per side of the optical sheet 45, and only a single number of the positioning locking piece 451 may be provide on one side of the optical sheet 45. Further, it is not necessary for the positioning locking piece 451 to be provided on the center part of the edge portion of the optical sheet 45, and the optical sheet 45 may be provided at a position separated from the center part.

The above-described light source unit 40 of the television receiving apparatus 1 may be used for other applications. For example, instead of the liquid crystal display panel 10, a transparent or translucent acrylic plate may be provided on the front surface of the light source unit 40 so as to be used as a lighting device for illuminating a living room by transmitted light. In addition, characters and graphics, or the like may be depicted on the acrylic plate so as to be used as an advertising device. The light source is not limited to the LED 51, but other light sources such as a cold-cathode fluorescent tube, electroluminescence device, laser diode (LD), or the like may be used.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

DESCRIPTION OF REFERENCE NUMERALS 1 television receiving apparatus
10 liquid crystal display panel
41 light guide plate
51 LED (light source)
47 panel chassis (reflection part)
47b reflection plate (protrusion portion)
47c attaching plate (elongated portion)
471a hook (protrusion part)
40 light source unit
43 diffusion sheet
44 diffusion plate
441a hook (protrusion part)
45 optical sheet
450 locking piece
451 positioning locking piece
70 support body (support part)
100 display apparatus

The invention claimed is:
1. A light source unit, comprising:
a light guide plate;
a light source facing to a peripheral surface of the light guide plate;
a reflection part reflecting light emitted from a front surface of the light guide plate; and
a diffusion plate to diffuse light which is separated from and disposed opposite to the front surface of the light guide plate
wherein the reflection part comprises:
a diffusion plate support portion supporting a rear edge part of the diffusion plate;
an elongated portion, which is positioned at an outside of an edge of the light guide plate, protruding from the diffusion plate support portion to the rear side; and
a protrusion portion protruding from the diffusion plate support portion toward an inside of the diffusion plate between the light guide plate and the diffusion plate and reflecting light emitted from the front surface of the light guide plate to irradiate to the diffusion plate,
wherein a front surface side of the light source is covered with the protrusion portion.
2. The light source unit according to claim 1,
wherein the protrusion portion is inclined with respect to the light guide plate and the diffusion plate.
3. The light source unit according to claim 2,
wherein the protrusion portion has an inclination angle of 30 degrees or more but less than 90 degrees.

4. The light source unit according to claim 1,
wherein a curved surface is formed on a part of the protrusion portion where the protrusion portion is opposite to the diffusion plate.

5. The light source unit according to claim 1,
wherein a part of the protrusion portion opposite to the diffusion plate is formed in a stepped shape.

6. The light source unit according to claim 1,
wherein a diffusion sheet to diffuse light is located on the front surface of the light guide plate.

7. The light source unit according claim 1,
further comprising:
a support part which is disposed between the diffusion plate and the light guide plate to support the diffusion plate, and which is translucent.

8. The light source unit according to claim 1,
further comprising:
a diffusion plate to diffuse light which is separated from and disposed opposite to the one surface of the light guide plate;
an optical sheet overlapped on the diffusion plate; and
a locking piece which is positioned outside of an edge portion of the diffusion plate, extends from an edge of the optical sheet in a direction crossing the diffusion plate, and has a hole,
wherein the reflection part has a protrusion part which is inserted into the hole.

9. The light source unit according to claim 1,
further comprising:
an optical sheet overlapped on the diffusion plate; and
a locking piece which is positioned outside of the diffusion plate away from an edge portion of the diffusion plate, extends from the edge of the optical sheet in the direction crossing the diffusion plate, and has a hole,
wherein the diffusion plate has a protrusion part which is inserted into the hole.

10. A display apparatus, comprising:
the light source unit according to claim 1; and
a display panel displaying an image by transmitting the light emitted from the light source unit, and is supported on the reflection part,
wherein the reflection part supports the display panel at an outside of a display region of the display panel.

11. A display apparatus, comprising:
the light source unit according to claim 1; and
a display panel displaying an image by transmitting the light emitted from the light source unit, and is supported on the reflection part,
wherein the light source is positioned within a display region of the display panel, and
the protrusion portion is positioned between the light source and the display panel.

* * * * *